US012789668B2

(12) United States Patent
Ma et al.

(10) Patent No.: US 12,789,668 B2
(45) Date of Patent: Nov. 10, 2026

(54) OVER-DISCHARGE PROTECTION METHOD AND SYSTEM, VEHICLE, BATTERY MANAGEMENT SYSTEM, AND STORAGE MEDIUM

(71) Applicant: CONTEMPORARY AMPEREX TECHNOLOGY (HONG KONG) LIMITED, Hong Kong (CN)

(72) Inventors: Hang Ma, Ningde (CN); Wei Tian, Ningde (CN); Xingchang Wang, Ningde (CN); Zhenhui Huang, Ningde (CN); Fangyou Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 774 days.

(21) Appl. No.: 18/139,359

(22) Filed: Apr. 26, 2023

(65) Prior Publication Data

US 2023/0256862 A1 Aug. 17, 2023

Related U.S. Application Data

(63) Continuation of application No. PCT/CN2021/117019, filed on Sep. 7, 2021.

(51) Int. Cl.

*H01M 10/44* (2006.01)
*B60L 58/14* (2019.01)
*H02J 7/63* (2026.01)

(52) U.S. Cl.

CPC ................ *B60L 58/14* (2019.02); *H02J 7/63* (2026.01); *B60L 2240/30* (2013.01); *B60L 2240/547* (2013.01)

(58) Field of Classification Search

CPC ... H02J 7/63; H02J 7/663; H02J 9/002; B60L 2240/547; B60L 2240/30; B60L 58/14

(Continued)

(56) References Cited

U.S. PATENT DOCUMENTS 9,692,240 B2 * 6/2017 Brockman ............ H01M 10/48
9,931,356 B2 * 4/2018 Harrison ................... A61P 9/10

(Continued)

FOREIGN PATENT DOCUMENTS

CN 101159340 A 4/2008
CN 106662618 A 5/2017

(Continued)

OTHER PUBLICATIONS

Machine translate of CN106663843B (Jun. 21, 2022) (Year: 2022).*

(Continued)

*Primary Examiner* — Edward Tso
(74) *Attorney, Agent, or Firm* — XSENSUS LLP

(57) ABSTRACT

A method is applied to the battery management system, and the method may include: detecting a current state of charge of the traction battery; when the current state of charge is less than a first preset state of charge and greater than or equal to a second preset state of charge, and the switcher is in the on state, turning off the switcher; and when the current state of charge is less than the first preset state of charge and greater than or equal to the second preset state of charge, and the switcher is in an off state, if a hardware trigger signal is received, turning on the switcher, where the second preset state of charge is less than the first preset state of charge.

12 Claims, 7 Drawing Sheets

(58) Field of Classification Search
USPC ................. 320/104, 107, 118, 127, 155, 136
See application file for complete search history.

(56) References Cited

U.S. PATENT DOCUMENTS

| | | | | |
|---|---|---|---|---|
| 2013/0057223 | A1 | 3/2013 | Lee | |
| 2015/0318725 | A1* | 11/2015 | Brockman | B60R 16/033 320/162 |
| 2018/0115178 | A1 | 4/2018 | Moon et al. | |
| 2019/0031126 | A1 | 1/2019 | Kawauchi | |
| 2019/0312449 | A1 | 10/2019 | Matsushita | |
| 2022/0340043 | A1 | 10/2022 | Qin | |

FOREIGN PATENT DOCUMENTS

| | | | | |
|---|---|---|---|---|
| CN | 106663843 | A | 5/2017 | |
| CN | 107689655 | A | 2/2018 | |
| CN | 109638387 | A | 4/2019 | |
| CN | 112882755 | A | 6/2021 | |
| CN | 113022758 | A | 6/2021 | |
| EP | 3187359 | A1 * | 7/2017 | H02J 9/005 |
| JP | 2014-096975 | A | 5/2014 | |
| JP | 2014-138508 | A | 7/2014 | |
| JP | 2018-139483 | A | 9/2018 | |
| KR | 10-2011-0114530 | A | 10/2011 | |
| WO | 2015/167889 | A1 | 11/2015 | |

OTHER PUBLICATIONS

Extended European Search Report issued Apr. 22, 2024 in European Patent Application No. 21956307.9.
Office Action issued Apr. 8, 20024 in Japanese Patent Application No. 2023-526412 with English translation thereof.
Office Action issued Jun. 13, 2025 in Korean Patent Application No. 10-2023-7016653 with English translation thereof.
Notice of Grant of Invention Patent Right issued Aug. 21, 2025 in Chinese Patent Application No. 202180054568.X with machine English translation thereof.
Notice of Allowance issued Jul. 16, 2024 in Japanese Patent Application No. 2023-526412 with machine English translation.
International Search Report and Written Opinion mailed on Jun. 9, 2022, received for PCT Application PCT/CN2021/117019, filed on Sep. 7, 2021, 8 pages including English Translation.
Notice of Allowance issued Feb. 12, 2026 in Korean Patent Application No. 10-2023-7016653 with English translation thereof.

* cited by examiner

OVER-DISCHARGE PROTECTION METHOD AND SYSTEM, VEHICLE, BATTERY MANAGEMENT SYSTEM, AND STORAGE MEDIUM

CROSS-REFERENCE TO RELATED APPLICATION

The present application is a continuation of International Application No. PCT/CN2021/117019, filed Sep. 7, 2021, which is incorporated herein by reference in its entirety.

TECHNICAL FIELD

The present application relates to the technical field of batteries, and in particular to an over-discharge protection method and system, a vehicle, a battery management system, and a storage medium.

BACKGROUND ART

With the continuous development of battery-related technologies, battery power supplies are widely used in mobile phones, electric vehicles, electric tools, and other energy storage. In the field of electric vehicles, a vehicle-mounted 12 V lithium battery power supply is taken as an example. The vehicle-mounted 12 V lithium battery power supply is usually used to power a start unit of a vehicle, so that the start unit is in an operating state. In this case, if the start unit receives an enabling signal, the vehicle can be started. The battery may also temporarily provide energy for a power consuming device in the vehicle after the vehicle is shut down.

In practical applications, a vehicle-mounted battery power supply may be over-discharged due to reasons such as forgetting to turn off a power consuming device in the vehicle for a long time, thereby causing damage to the battery. Currently, to prevent the battery power supply from being over-discharged, after a state of charge of the battery power supply approaches 0, technical personnel usually control the battery to be in an over-discharge protection state, that is, breaking a connection line between the battery and the power consuming device to protect the battery, and the connection line includes a connection line between the battery and a start unit of the vehicle. Once the battery is in the over-discharge protection state, only an additional low-current apparatus can be used to recharge the battery. Otherwise, the connection line between the battery and the start unit cannot be restored, and the vehicle cannot be started, resulting in poor user experience.

SUMMARY OF THE DISCLOSURE

Embodiments of the present application provide an over-discharge protection method and system, a vehicle, a battery management system, and a storage medium, so that when a current state of charge of a traction battery is still enough to start a vehicle, a discharge circuit of the battery is disconnected for the first time to reduce an energy loss of the traction battery, so as to use the energy of the traction battery to start the vehicle as much as possible, thereby improving the user experience.

According to a first aspect, an embodiment of the present application provides an over-discharge protection method of a vehicle, where the vehicle includes a traction battery, a switch unit or switcher, a start unit or starter, and a battery management system, where the switch unit is connected between the traction battery and the start unit, and when the switch unit is in an on state, the traction battery powers the start unit; the start unit is capable of starting the vehicle when receiving an enabling signal in a state of being powered; the battery management system is connected to a control terminal of the switch unit for controlling the switch unit to be turned on or off, and the battery management system is further connected to the traction battery; and the method is applied to the battery management system, and the method includes: detecting a current state of charge of the traction battery; when the current state of charge is less than a first preset state of charge and greater than or equal to a second preset state of charge, and the switch unit is in the on state, turning off the switch unit; and when the current state of charge is less than the first preset state of charge and greater than or equal to the second preset state of charge, and the switch unit is in an off state, if a hardware trigger signal is received, turning on the switch unit, where the second preset state of charge is less than the first preset state of charge.

In the technical solution of this embodiment of the present application, when the current state of charge is reduced to less than the first preset state of charge, the battery management system may cut off a path between the traction battery and the start unit by turning off the switch unit, thereby reducing static energy consumption of the switch unit and the start unit. Before the current state of charge is further reduced to the second preset state of charge, if a hardware trigger signal sent by a user through the wake-up unit of the vehicle is received, the traction battery and the start unit may be further connected by turning on the switch unit, to start the vehicle. In the related art, only when the current state of charge of the traction battery is about to be reduced to 0, a path between the traction battery and the start unit is controlled to be always in the off state to protect the traction battery from being over-discharged. Compared with the prior art, in this embodiment of the present application, when the current state of charge of the traction battery is still enough to start the vehicle, a discharge circuit of the battery is disconnected for the first time, to prompt the user that the traction battery has a low battery and needs to be charged, and reduce an energy loss of the traction battery, so as to use the energy of the traction battery to start the vehicle as much as possible, thereby improving the user experience.

In some embodiments, if the hardware trigger signal is received, after the switch unit is turned on, the method further includes: if the hardware trigger signal is not received within a first preset time after the switch unit is turned on, turning off the switch unit.

In the foregoing embodiment, if the hardware trigger signal is not received within the first preset time after the switch unit is turned on, it is considered that the user does not need to start the vehicle at this time, and the switch unit is turned off at this time to reduce an energy loss. The energy of the traction battery is used to start the vehicle as much as possible, which improves the user experience.

In some embodiments, a difference between the first preset state of charge and the second preset state of charge is greater than the sum of a self-discharge power loss and an on power loss, where the self-discharge power loss is an amount of power lost by the traction battery after a second preset time when the switch unit is in the off state, and the on power loss is an amount of power lost by the traction battery after the first preset time when the switch unit is in the on state.

In the foregoing embodiment, the difference between the first preset state of charge and the second preset state of charge is set such that: the difference is enough for the battery to make it possible that the switch unit can be turned on by using a hardware trigger signal at any time within the second preset time, and the switch unit can be kept on for the first preset time, so that the traction battery can power the start unit, and the start unit can start the vehicle when receiving an enabling signal, which improves the user experience.

In some embodiments, the turning off the switch unit includes: if it is detected that the vehicle is in a parking brake state, turning off the switch unit.

In the foregoing embodiment, if the switch unit is turned off when the vehicle is in a traveling state, it may cause a power consuming device of the vehicle that is connected behind the switch unit to be powered off, which may affect traveling safety. In the present application, before the switch unit is turned off, it needs to first detect whether the vehicle is in the parking brake state, and if the vehicle is in the parking brake state, the switch unit is then turned off, which effectively improves the traveling safety of the vehicle.

In some embodiments, after the switch unit is turned off, the method further includes: when a time during which the switch unit is in the off state is greater than or equal to a third preset time, if the hardware trigger signal is received, prohibiting the switch unit from being turned on.

In the foregoing embodiment, when the time during which the switch unit is in the off state reaches the third preset time, it is considered that the vehicle has been left for too long, and there may be a risk that the battery is over-discharged. At this time, even if a hardware trigger signal is received, the switch unit is kept in the off state to protect the battery from being damaged due to over-discharge. In addition, even if the battery management system incorrectly determines that the current state of charge of the battery is between the first preset state of charge and the second preset state of charge, but determines that the time during which the switch unit is in the off state exceeds the third preset time, the switch unit may still be kept in the off state. It can be seen that the double determination more effectively ensures that the traction battery may not be damaged due to over-discharge, and also improves the safety of the vehicle.

In some embodiments, the battery management system includes a wake-up unit or structure and a driving unit or structure; and a first end of the wake-up unit is connected to a first end of a hardware switch of the vehicle, a second end of the hardware switch is grounded, a second end of the wake-up unit is connected to the traction battery, and a third end of the wake-up unit is connected to the switch unit through the driving unit, where the hardware switch is controlled by a user to be in the off state or the on state, the first end of the wake-up unit receives the hardware trigger signal when the hardware switch is in the on state, after the first end of the wake-up unit receives the hardware trigger signal, the second end of the wake-up unit and the third end of the wake-up unit are connected, such that the traction battery powers the driving unit, and when the driving unit is in the state of being powered, the current state of charge is less than the first preset state of charge and greater than or equal to the second preset state of charge, the switch unit is in the off state, and the hardware trigger signal is received, the switch unit is capable of being turned on.

In the foregoing embodiment, the user may ground the first end of the wake-up unit by turning on the hardware switch, so as to simulate the first end of the wake-up unit having received a hardware trigger signal. In this case, the wake-up unit may connect the traction battery and the driving unit, such that the traction battery powers the driving unit so that the driving unit is in a controllable state. Then, when the current state of charge is less than the first preset state of charge and greater than or equal to the second preset state of charge, the switch unit is in the off state, and a hardware trigger signal is received, the switch unit may be turned on. In this embodiment of the present application, the driving unit used to control the switch unit is directly powered by the traction battery, no additional battery is required for power supply, and it is also possible to avoid affecting the control of the switch unit due to the failure of an additional battery, which improves the operating stability of the vehicle.

In some embodiments, the wake-up unit is a PNP transistor, a base of the transistor serves as the first end of the wake-up unit, an emitter or a collector of the transistor serves as the second end of the wake-up unit, and the collector or the emitter of the transistor serves as the third end of the wake-up unit.

In some embodiments, the vehicle further includes a conversion unit or converter; the traction battery is connected to the second end of the wake-up unit through the conversion unit; and the conversion unit is configured to convert a voltage output by the traction battery into a voltage within a range of voltages that the wake-up unit is capable of receiving.

In the foregoing embodiment, the system may be adapted to traction batteries that output different voltages by providing the conversion unit.

In some embodiments, the battery management system further includes a diode; and the first end of the wake-up unit is connected to the first end of the hardware switch through the diode, the first end of the wake-up unit is connected to an anode of the diode, and a cathode of the diode is connected to the first end of the hardware switch.

In the foregoing embodiment, the battery management system is further provided with the diode, which plays a role in preventing backflow, to protect a wake-up circuit from being damaged, and effectively improve the reliability of the wake-up circuit.

According to a second aspect, an embodiment of the present application provides an over-discharge protection system of a vehicle, where the vehicle includes a traction battery, a switch unit, a start unit, and a battery management system, where the switch unit is connected between the traction battery and the start unit, and when the switch unit is in an on state, the traction battery powers the start unit; the start unit is capable of starting the vehicle when receiving an enabling signal in a state of being powered; the battery management system is connected to a control terminal of the switch unit for controlling the switch unit to be turned on or off, and the battery management system is further connected to the traction battery; and the system includes: a detection unit or detector configured to detect a current state of charge of the traction battery; and a control unit or controller configured to: when the current state of charge is less than a first preset state of charge and greater than or equal to a second preset state of charge, and the switch unit is in the on state, turn off the switch unit; and when the current state of charge is less than the first preset state of charge and greater than or equal to the second preset state of charge, and the switch unit is in an off state, if a hardware trigger signal is received, turn on the switch unit, where the second preset state of charge is less than the first preset state of charge.

According to a third aspect, an embodiment of the present application provides a vehicle, including the foregoing over-discharge protection system of the vehicle.

According to a fourth aspect, an embodiment of the present application provides a battery management system, including: at least one processor; and a memory communicatively connected to the at least one processor, where the memory stores instructions executable by the at least one processor, and when executed by the at least one processor, the instructions cause the at least one processor to perform the over-discharge protection method of the vehicle according to any one of the foregoing embodiments.

According to a fifth aspect, an embodiment of the present application provides a computer-readable storage medium having stored thereon a computer program that, when executed by a processor, implements the over-discharge protection method of the vehicle according to any one of the foregoing embodiments.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

Figure 1:
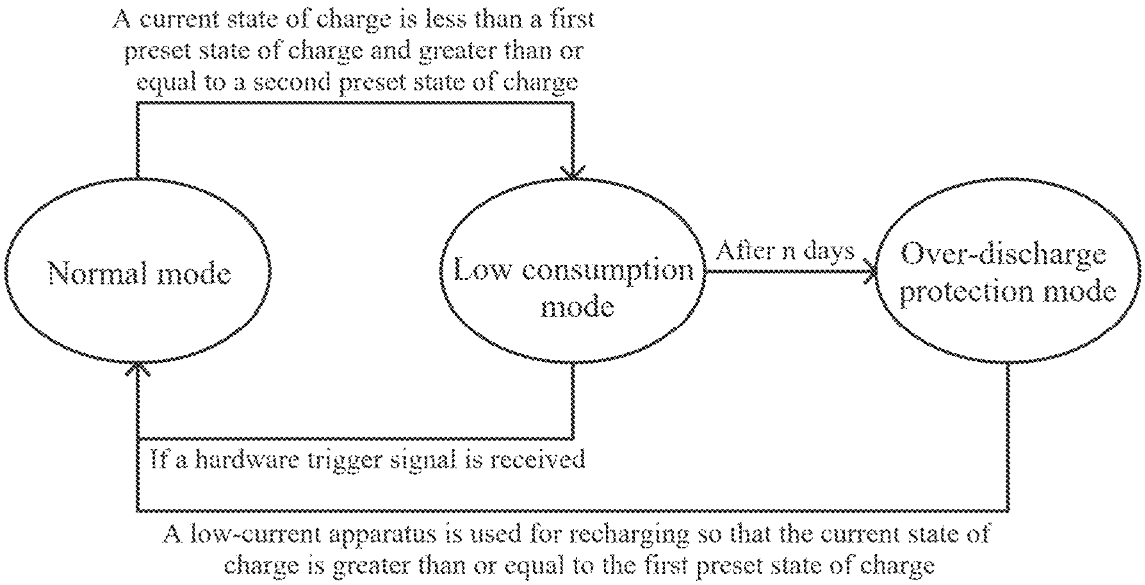
FIG. 1 is a schematic diagram of mode conversion of a traction battery according to an embodiment of the present application.

In the accompanying drawings, the figures are not drawn to scale.

List of reference signs: 1: battery management system; 2: traction battery; 3: switch unit; 4: start unit; 5: hardware switch; 6: conversion unit; 11: wake-up unit; 12: driving unit; Q1: PNP transistor; D1: diode; R1: resistor; R2: resistor; 501: detection unit; 502: control unit; 601: processor; 602: memory.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that “a plurality of” means two or more, unless otherwise specified. The orientation or position relationship indicated by the terms “upper”, “lower”, “left”, “right”, “inner”, “outer”, etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms “first”, “second”, “third”, etc. are used for descriptive purposes only, and should not be construed as indicating or implying the relative importance. The term “perpendicular” does not mean being perpendicular in the strict sense, but within an allowable range of errors. The term “parallel” does not mean being parallel in the strict sense, but within an allowable range of errors.

The orientation terms in the following description all indicate directions shown in the drawings, but do not limit the specific structure in the present application. In the description of the present application, it should also be noted that the terms “disposing”, “connecting”, and “connection” should be interpreted in the broad sense unless explicitly defined and limited otherwise. For example, the terms may mean a fixed connection, a detachable connection, or an integral connection, or may mean a direct connection, or an indirect connection by means of an intermediate medium. For those of ordinary skill in the art, the specific meanings of the terms mentioned above in the present application can be construed according to specific circumstances.

The phrase “embodiment” mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term “and/or” is merely intended to describe the associated relationship of associated objects, indicating that three relationships can exist, for example, A and/or B can include: the three instances of A alone, A and B simultaneously, and B alone. In addition, the character “/” herein generally indicates an “or” relationship between the associated objects.

With the continuous development of battery-related technologies, battery power supplies are widely used in mobile phones, electric vehicles, electric tools, and other energy storage. In the field of electric vehicles, a vehicle-mounted 12 V lithium battery power supply is taken as an example. The vehicle-mounted 12 V lithium battery power supply is usually used to power a start unit of a vehicle, so that the start unit is in an operating state. In this case, if the start unit receives an enabling signal, the vehicle can be started. The vehicle-mounted 12 V lithium battery power supply may also be used to temporarily provide energy for a power consuming device in the vehicle after the vehicle is shut down.

In practical applications, since a connection line between the battery and the power consuming device or the start unit is usually in a normally closed state, the battery may be over-discharged due to reasons such as forgetting to turn off a power consuming device in the vehicle for a long time, thereby causing damage to the battery. For example, lithium-ion batteries usually use lithium alloy metal oxide as a positive electrode material of the lithium-ion batteries, use graphite as a negative electrode material of the lithium-ion batteries, and use non-aqueous electrolytes. After a state of charge of a lithium battery is a value approaching 0, if the lithium battery continues to be discharged, the lithium battery may be damaged.

Currently, to prevent the battery from being over-discharged, after the state of charge of the battery approaches 0, technical personnel usually control the battery to be in an over-discharge protection state, that is, a switch unit between the battery and the power consuming device or the start unit is kept off, to keep the connection line between the battery and the power consuming device or the start unit to be always broken, so as to protect the battery, until it is detected that a state of charge of the battery is greater than a preset value. Then, it is considered that there is no longer a risk that the battery is over-discharged, and then the switch unit is turned on to connect the connection line between the battery and the power consuming device or the start unit, such that the battery powers the power consuming device or the start unit.

The inventors of the present application have noticed that once the battery is in the over-discharge protection state, only an additional low-current apparatus can be used to recharge the battery. Otherwise, the connection line between the battery and the start unit cannot be restored, and the vehicle cannot be started. However, such a low-current apparatus is usually not equipped on an electric vehicle, and a user can only go to after-sales stores of the electric vehicle to find a matching low-current apparatus to recharge the battery, resulting in poor user experience.

On the basis of the above problems, the present application proposes the following technical ideas: Two preset states of charge are set, that is, a first preset state of charge and a second preset state of charge, where the second preset state of charge is less than the first preset state of charge. When it is detected that the state of charge of the battery is less than the higher first preset state of charge, the switch unit on the connection line between the traction battery and the start unit is turned off for the first time. In this case, the traction battery no longer powers the start unit, which reduces an energy loss. After receiving a hardware trigger signal generated by triggering external hardware by the user, the traction battery is used to power the start unit by turning on the switch unit, so that the start unit starts the vehicle when receiving an enabling signal; When it is detected that the state of charge of the battery is greater than the lower second preset state of charge, it is considered that there is currently a risk that the battery is over-discharged, and in this case, the switch unit is kept off.

In some embodiments, referring to FIG. 1, when the current state of charge is greater than or equal to the first preset state of charge, it is considered that the traction battery is currently in a normal mode, and the traction battery may power the start unit normally in this case. When the current state of charge is less than the first preset state of charge and greater than or equal to the second preset state of charge, the switch unit is turned off, such that the traction battery is in a low loss mode. When the traction battery is in this mode, if a hardware trigger signal is received, the switch unit may be turned on, such that the traction battery is in the normal mode, that is, the traction battery may power the start unit. After the traction battery enters the low loss mode for n days, where n is a positive number, and it is considered that the current state of charge may be less than the second preset state of charge. In this case, the traction battery is in an over-discharge protection mode. When the traction battery is in this mode, even if a hardware trigger signal is received, the switch unit is not turned on, to protect the battery from being damaged. Only a low-current apparatus can be used for recharging so that the state of charge of the traction battery is greater than or equal to the first preset state of charge, that is, the traction battery returns to the normal mode.

Figure 2:
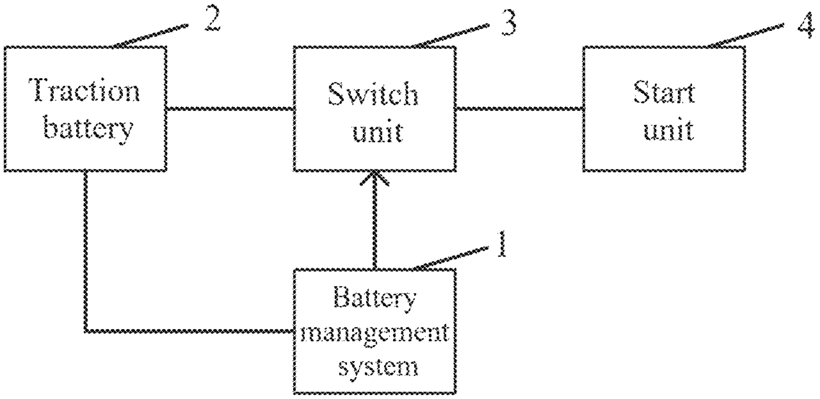
FIG. 2 is a schematic structure diagram 1 of a vehicle according to an embodiment of the present application.

An embodiment of the present application provides an over-discharge protection method of a vehicle, which is applied to a battery management system (BMS) 1 in the vehicle. Referring to FIG. 2, the vehicle further includes: a traction battery 2, a switch unit 3, and a start unit 4.

The switch unit 3 is connected between the traction battery 2 and the start unit 4, and when the switch unit 3 is in an on state, the traction battery 2 may power the start unit 4. The start unit 4 is capable of starting the vehicle when receiving an enabling signal in a state of being powered. In addition, the battery management system 1 is connected to a control terminal of the switch unit 3 for controlling the switch unit 3 to be turned on or off, and the battery management system 1 is further connected to the traction battery 2.

Figure 3:
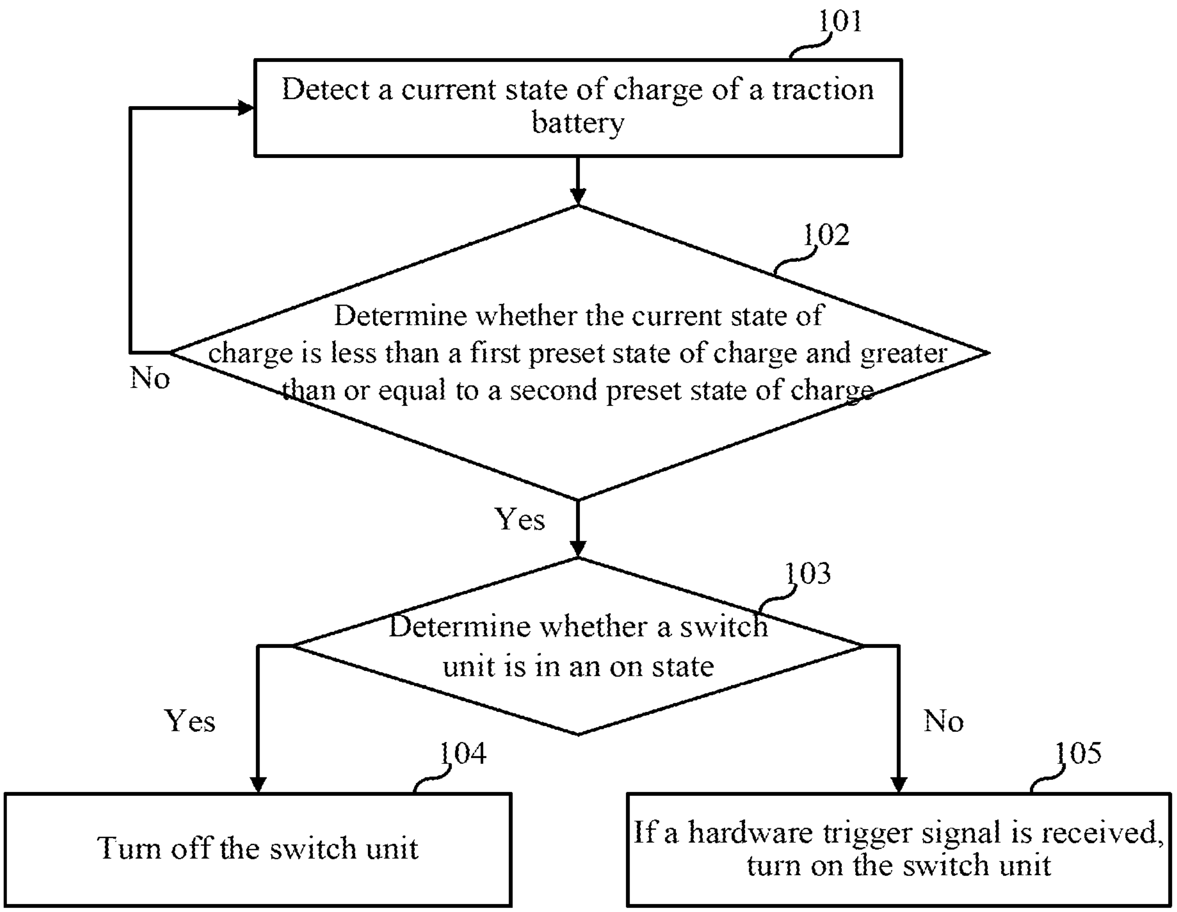
FIG. 3 is a schematic flowchart 1 of an over-discharge protection method of a vehicle according to an embodiment of the present application.

According to some embodiments of the present application, for a schematic flowchart of the over-discharge protection method of the vehicle, reference may be made to FIG. 3. The method includes:

step 101: detecting a current state of charge of the traction battery;

step 102: determining whether the current state of charge is less than a first preset state of charge and greater than or equal to a second preset state of charge, and if yes, proceeding to step 103; otherwise, continuing to perform step 101, where the second preset state of charge is less than the first preset state of charge;

step 103: determining whether the switch unit is in an on state, and if yes, proceeding to step 104; otherwise, proceeding to step 105;

step 104: turning off the switch unit; and step 105: if a hardware trigger signal is received, turning on the switch unit.

Specifically, the BMS detects the current state of charge of the traction battery. The BMS may determine whether the detected current state of charge of the traction battery is between the first preset state of charge and the second preset state of charge, if the detected current state of charge is between the first preset state of charge and the second preset state of charge, it is further determined whether the switch unit is in the on state, and if the switch unit is still in the on state, the switch unit is turned off to reduce an energy loss of the traction battery. If the switch unit is already in the off state, and if a hardware trigger signal is received in this case, the switch unit is turned on such that the traction battery powers the start unit, and then the vehicle can be started by sending an enabling signal to the start unit. If the current state of charge is not between the first preset state of charge and the second preset state of charge, the BMS detects the current state of charge of the battery again, and continues to determine whether the current state of charge after the update is between the first preset state of charge and the second preset state of charge.

In some embodiments, if it is determined that the current state of charge is less than the second preset state of charge, it is considered that there is currently a risk that the battery is over-discharged, and the switch unit is kept off to protect the battery from being damaged due to over-discharge. A value of the second preset state of charge is usually obtained by technical personnel through a large number of factory experimental tests.

In some embodiments, the hardware trigger signal may be a signal generated by a user through a hardware switch disposed outside the vehicle, and the hardware switch is, for example, a trunk door of the vehicle or a door handle of a vehicle door of the vehicle, but is not limited thereto. The user uses the hardware switch to generate a hardware trigger signal. For example, the user may open the trunk door of the vehicle to generate the hardware trigger signal, or the user may turn the door handle of the vehicle door of the vehicle to generate the hardware trigger signal, which is not limited herein.

In this embodiment, the BMS may detect the current state of charge of the traction battery. When the current state of charge is reduced to less than the first preset state of charge, the BMS may cut off a path between the traction battery and the start unit by turning off the switch unit, thereby reducing static energy consumption of the switch unit and the start unit. Before the current state of charge is further reduced to the second preset state of charge, if a hardware trigger signal sent by the user through the wake-up unit of the vehicle is received, the traction battery and the start unit may be further connected by turning on the switch unit, to start the vehicle. When the current state of charge of the battery is reduced to less than the second preset state of charge, even if the hardware trigger signal is received, the BMS may no longer turn on the switch unit to keep the path between the traction battery and the start unit in the off state, to ensure that the traction battery no longer discharges to the start unit through the switch unit, and to prevent the traction battery from being damaged due to over-discharge. In the related art, only when the current state of charge of the traction battery is about to be reduced to 0, a path between the traction battery and the start unit is controlled to be always in the off state to protect the traction battery from being over-discharged. Compared with the prior art, in the present application, when the current state of charge of the traction battery is still enough to start the vehicle, a discharge circuit of the battery is disconnected for the first time, to prompt the user that the traction battery has a low battery and needs to be charged, and reduce an energy loss of the traction battery, so as to use the energy of the traction battery to start the vehicle as much as possible, thereby improving the user experience.

Figure 4:
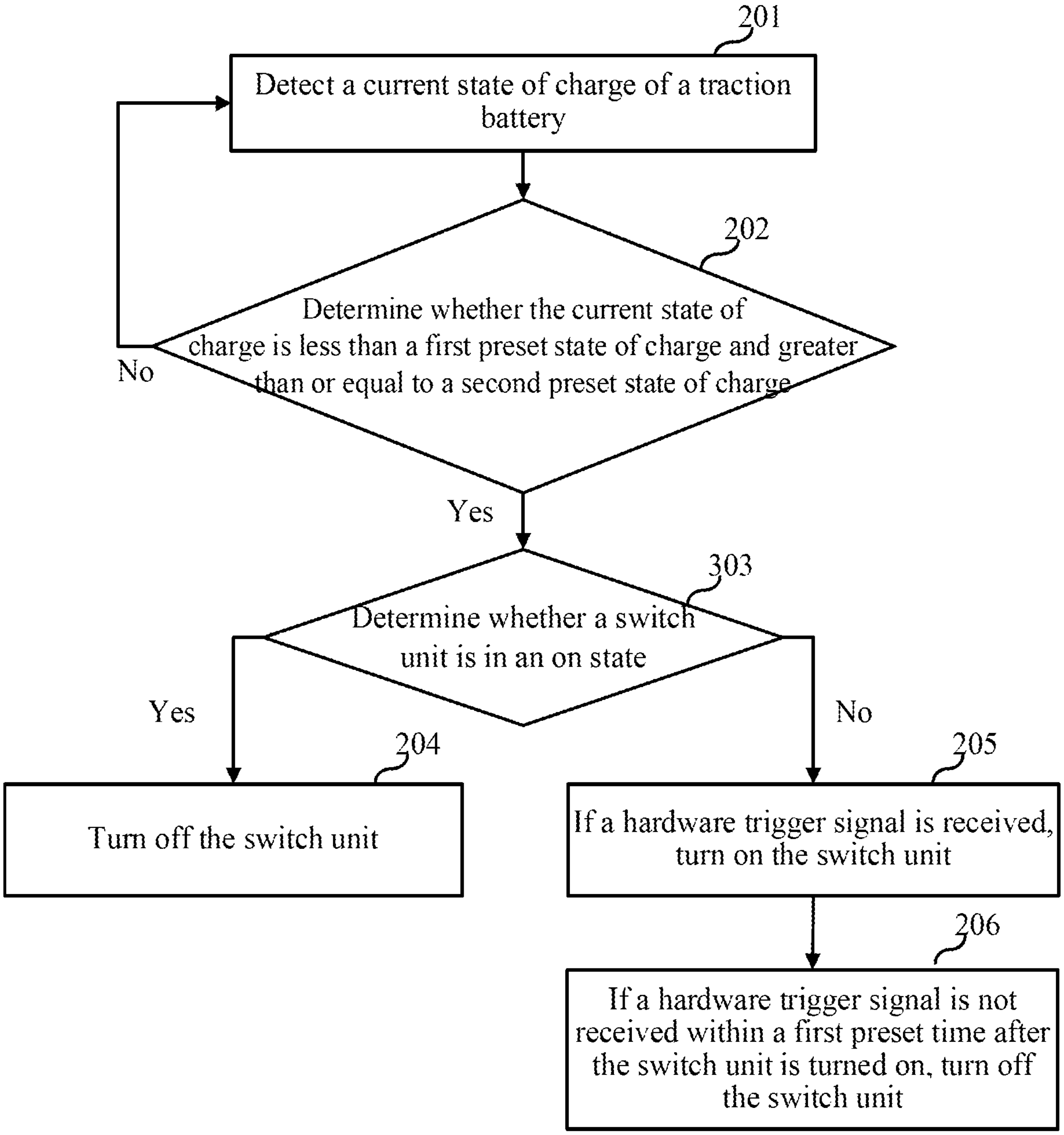
FIG. 4 is a schematic flowchart 2 of an over-discharge protection method of a vehicle according to an embodiment of the present application.

In some embodiments, referring to FIG. 4, steps 201 to 205 are substantially the same as steps 101 to 105, and will not be repeated herein, except that step 206 is further included.

In step 206, if the hardware trigger signal is not received within a first preset time after the switch unit is turned on, the switch unit is turned off.

A setting of the first preset time is usually obtained by technical personnel through a large number of factory experimental tests. It should be noted that the first preset time needs to be set greater than a time from the start unit being powered to receiving an enabling signal and starting the vehicle, to enable the vehicle to be started by keeping the switch unit on for the first preset time.

In this embodiment, if the hardware trigger signal is not received within the first preset time after the switch unit is turned on, it is considered that the user does not need to start the vehicle at this time, and the switch unit is turned off at this time to reduce an energy loss. The energy of the traction battery is used to start the vehicle as much as possible, which improves the user experience.

In some embodiments, a difference between the first preset state of charge and the second preset state of charge is set greater than the sum of a self-discharge power loss and an on power loss.

The self-discharge power loss is an amount of power lost by the traction battery after a second preset time when the switch unit is in the off state. The self-discharge power loss may be understood as an amount of power lost after the second preset time when the traction battery does not power the start unit. This part of the loss mainly considers a self-discharge rate of a battery cell in the traction battery, and a 100 uA power consumption of a PCB board soldered with the traction battery, the switch unit, the start unit, and the like. The second preset time is usually obtained by technical personnel through a large number of factory experimental tests.

The on power loss is an amount of power lost by the traction battery after the first preset time when the switch unit is in the on state. The on power loss may be understood as an amount of power lost by the traction battery after a time for which the traction battery powers the start unit reaches the first preset time.

In this embodiment, the difference between the first preset state of charge and the second preset state of charge is set such that: the difference is enough for the battery to make it possible that the switch unit can be turned on by using a hardware trigger signal at any time within the second preset time, and the switch unit can be kept on for the first preset time, so that the traction battery can power the start unit, and the start unit can start the vehicle when receiving an enabling signal, which improves the user experience.

Figure 5:
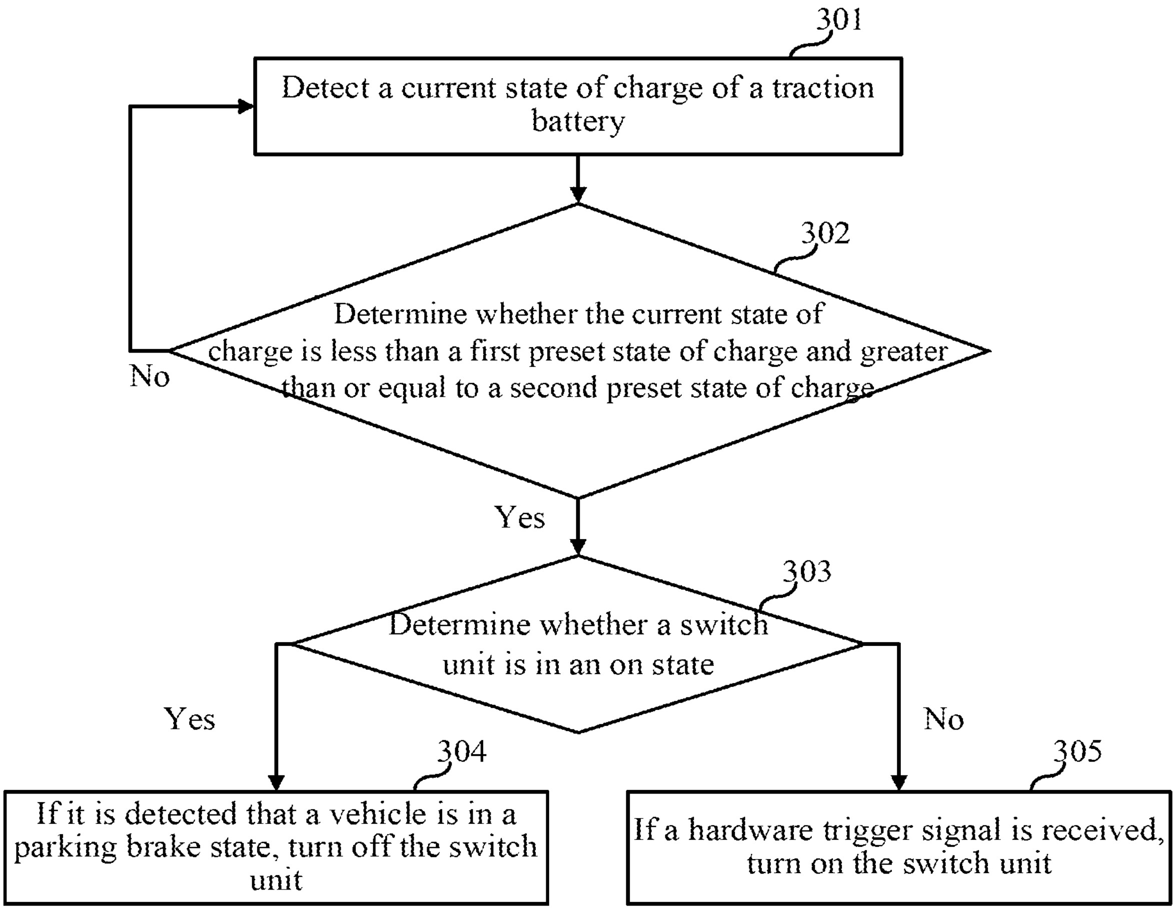
FIG. 5 is a schematic flowchart 3 of an over-discharge protection method of a vehicle according to an embodiment of the present application.

In some embodiments, referring to FIG. 5, step 301, step 302, step 303, and step 305 are substantially the same as step 101, step 102, step 103, and step 105, and will not be repeated herein, except that step 304 is different.

In step 304, if it is detected that the vehicle is in a parking brake state, the switch unit is turned off.

The vehicle is in the parking brake state, that is, the vehicle is in a parked state. For example, whether the vehicle is in the parking brake state may be determined by detecting a distance traveled by the vehicle within a preset time.

Because the traction battery may be alternatively connected to other power consuming devices through the switch unit, if the switch unit is turned off when the vehicle is in a traveling state, it may affect the use of some power consuming devices, and these power consuming devices may affect the traveling safety of the vehicle, for example, an electric lock of the vehicle door may fail due to the off of the switch unit, and thus further affect the safety of the vehicle. Therefore, this embodiment of the present application will reduce the energy loss of the traction battery by turning off the switch unit when it is detected that the vehicle is in the parking brake state and the traveling safety of the vehicle is not affected.

In this embodiment, if the switch unit is turned off when the vehicle is in the traveling state, it may cause a power consuming device of the vehicle that is connected behind the switch unit to be powered off, which may affect traveling safety. In the present application, before the switch unit is turned off, it needs to first detect whether the vehicle is in the parking brake state, and if the vehicle is in the parking brake state, the switch unit is then turned off, which effectively improves the traveling safety of the vehicle.

Figure 6:
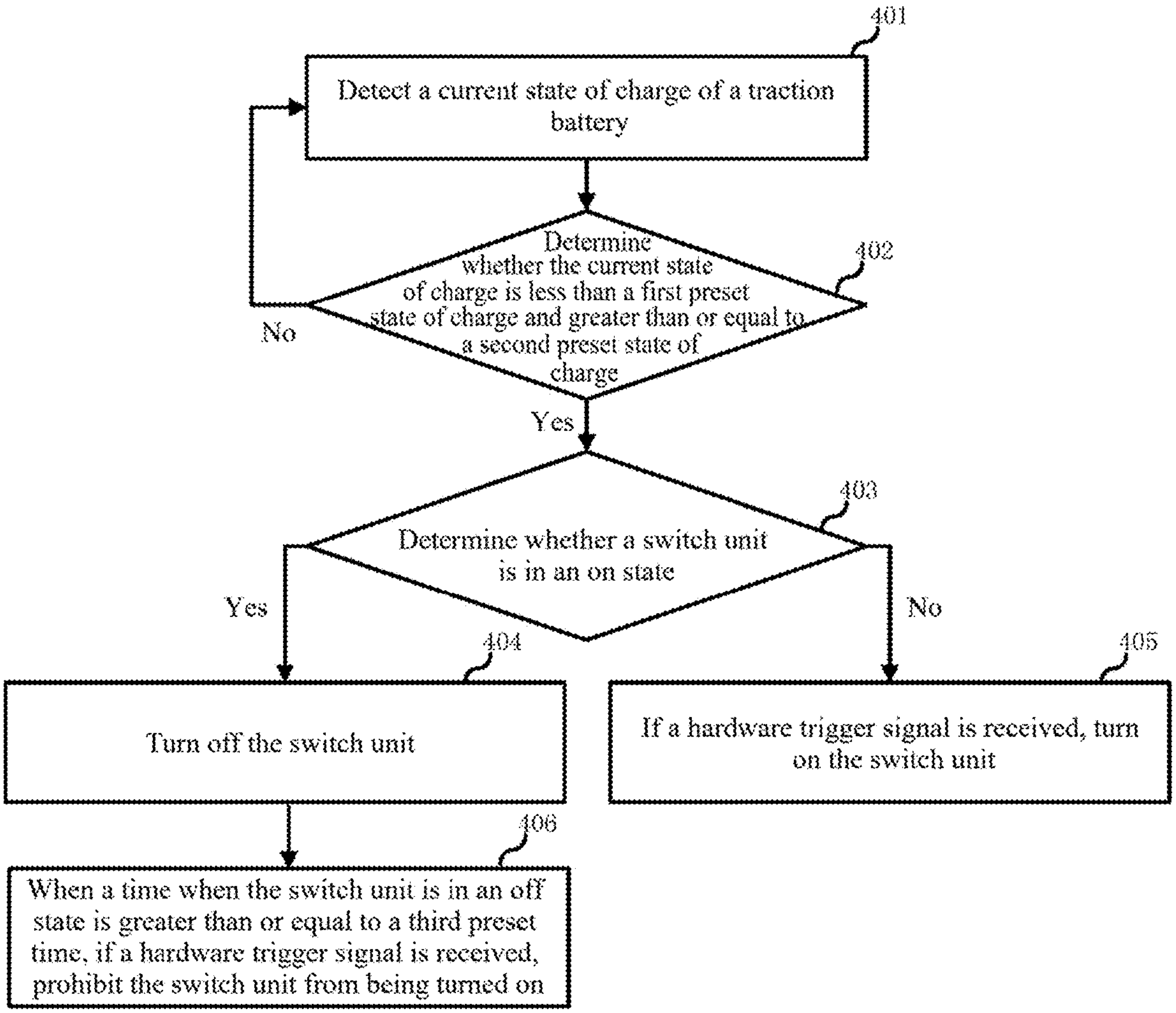
FIG. 6 is a schematic flowchart 4 of an over-discharge protection method of a vehicle according to an embodiment of the present application.

In some embodiments, referring to FIG. 6, steps 401 to 405 are substantially the same as steps 101 to 105, and will not be repeated herein, except that step 406 is further included.

In step 406, when a time during which the switch unit is in the off state is greater than or equal to a third preset time, if the hardware trigger signal is received, the switch unit is prohibited from being turned on.

The third preset time is usually obtained by technical personnel through a large number of factory experimental tests. When the time that the switch unit is in the off state is greater than or equal to the third preset time, it may be considered that the vehicle has been left for too long, and there may be a risk that the battery is over-discharged. At this time, even if a hardware trigger signal is received, the switch unit is kept in the off state.

In this embodiment, when the time during which the switch unit is in the off state reaches the third preset time, it is considered that the vehicle has been left for too long, and there may be a risk that the battery is over-discharged. At this time, even if a hardware trigger signal is received, the switch unit is kept in the off state to protect the battery from being damaged due to over-discharge. In addition, even if the battery management system incorrectly determines that the current state of charge of the battery is between the first preset state of charge and the second preset state of charge, but determines that the time during which the switch unit is in the off state exceeds the third preset time, the switch unit may still be kept in the off state. It can be seen that the double determination more effectively ensures that the traction battery may not be damaged due to over-discharge, and also improves the safety of the vehicle.

Figure 7:
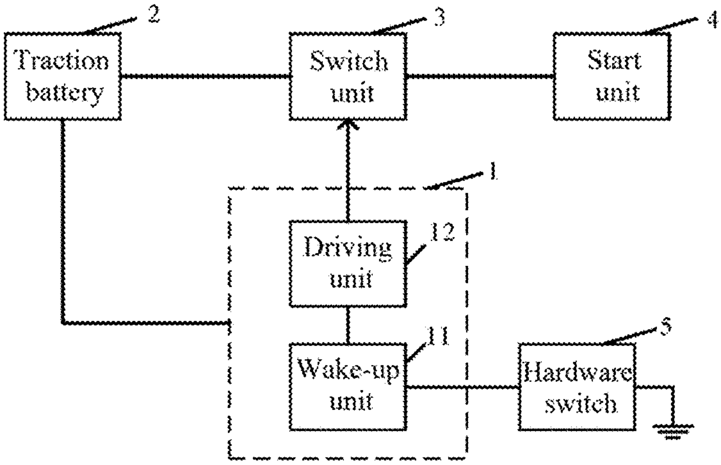
FIG. 7 is a schematic structure diagram 2 of a vehicle according to an embodiment of the present application.

In some embodiments, referring to FIG. 7, a battery management system 1 includes a wake-up unit 11 and a driving unit 12, and a connection relationship is as follows: a first end of the wake-up unit 11 is connected to a first end of a hardware switch 5 of the vehicle, a second end of the hardware switch is grounded, a second end of the wake-up unit 11 is connected to the traction battery 2, and a third end of the wake-up unit 11 is connected to the switch unit 3 through the driving unit 12.

The hardware switch 5 is controlled by a user to be in the off state or the on state, the first end of the wake-up unit 11 may receive the hardware trigger signal when the hardware switch 5 is in the on state, after the first end of the wake-up unit 11 receives the hardware trigger signal, the second end of the wake-up unit 11 and the third end of the wake-up unit 11 are connected, such that the traction battery 2 powers the driving unit 12, and when the driving unit 12 is in the state of being powered, the current state of charge is less than the first preset state of charge and greater than or equal to the second preset state of charge, the switch unit 3 is in the off state, and the hardware trigger signal is received, the switch unit 3 is capable of being turned on.

The battery management system 1 specifically includes the wake-up unit 11 and the driving unit 12. The user may ground the first end of the wake-up unit 11 by turning on the hardware switch 5, so as to simulate the first end of the wake-up unit 11 having received a hardware trigger signal. In this case, the wake-up unit 11 may connect the traction battery 2 and the start unit 4, such that the traction battery 2 powers the start unit 4 so that the start unit 4 is in a controllable state. Then, when the current state of charge is less than the first preset state of charge and greater than or equal to the second preset state of charge, the switch unit 3 is in the off state, and a hardware trigger signal is received, the start unit 4 may turn on the switch unit 3.

In some embodiments, the hardware switch 5 may be a trunk door of the vehicle or a door handle of a vehicle door of the vehicle, but is not limited thereto. The user uses the hardware switch 5 to generate a hardware trigger signal. For example, the user may open the trunk door of the vehicle to generate the hardware trigger signal, or the user may turn the door handle of the vehicle door of the vehicle to generate the hardware trigger signal, which is not limited herein.

In this embodiment, the battery management system specifically includes a wake-up unit and a driving unit. The user may ground the first end of the wake-up unit by turning on the hardware switch, so as to simulate the first end of the wake-up unit having received a hardware trigger signal. In this case, the wake-up unit may connect the traction battery and the driving unit, such that the traction battery powers the driving unit so that the driving unit is in a controllable state. Then, when the current state of charge is less than the first preset state of charge and greater than or equal to the second preset state of charge, the switch unit is in the off state, and a hardware trigger signal is received, the switch unit may be turned on. In the present application, the driving unit used to control the switch unit is directly powered by the traction battery, no additional battery is required for power supply, and it is also possible to avoid affecting the control of the switch unit due to the failure of an additional battery, which improves the operating stability of the vehicle.

Figure 8:
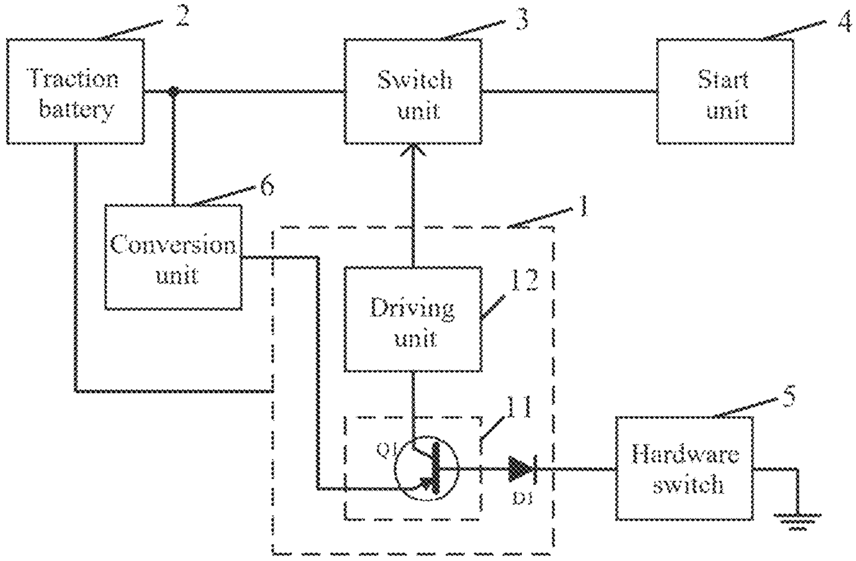
FIG. 8 is a schematic structure diagram 3 of a vehicle according to an embodiment of the present application.

In some embodiments, referring to FIG. 8, the wake-up unit 11 is a PNP transistor Q1.

Specifically, a base of the transistor Q1 serves as the first end of the wake-up unit 11, an emitter or a collector of the transistor Q1 serves as the second end of the wake-up unit 11, and the collector or the emitter of the transistor Q1 serves as the third end of the wake-up unit 11.

In some embodiments, referring to FIG. 8, the vehicle further includes a conversion unit 6, and the traction battery 2 is connected to the second end of the wake-up unit 11 through the conversion unit 6.

The conversion unit 6 is configured to convert a voltage output by the traction battery 2 into a voltage within a range of voltages that the wake-up unit 11 is capable of receiving.

Since the voltage output by the traction battery 2 may not match the range of voltages that the wake-up unit 11 is capable of receiving, this may cause the traction battery 2 to fail to power the driving unit 12 through the wake-up unit 11. In this embodiment of the present application, the conversion unit 6 is provided to convert the voltage output by the traction battery 2 into a voltage within the range of voltages that the wake-up unit 11 is capable of receiving, and then the driving unit 12 is powered through the wake-up unit 11.

In this embodiment, the power management system may be adapted to traction batteries that output different voltages by providing the conversion unit.

In some embodiments, referring to FIG. 8, the battery management system 1 further includes a diode D1.

The first end of the wake-up unit 11 is connected to the first end of the hardware switch 5 through the diode D1, the first end of the wake-up unit 11 is connected to an anode of the diode D1, and a cathode of the diode D1 is connected to the first end of the hardware switch 5.

In this embodiment, the battery management system is further provided with the diode, which plays a role in preventing backflow, to protect a wake-up circuit from being damaged, and effectively improve the reliability of the wake-up circuit.

Figure 9:
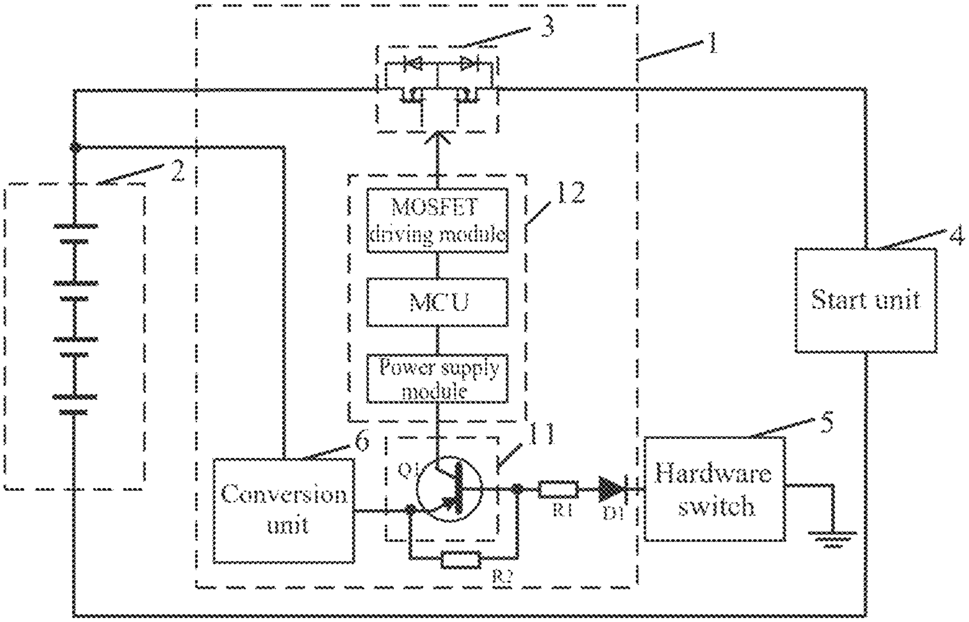
FIG. 9 is a schematic structure diagram 4 of a vehicle according to an embodiment of the present application.

In some embodiments, referring to FIG. 9, the traction battery 2 is specifically a structure in which a plurality of cells are connected, the traction battery 2 is connected to the battery management system 1, the switch unit 3 is arranged in the battery management system 1, and the switch unit 3 is specifically a MOSFET array shown in the figure and is arranged on a connection line between a positive electrode of the traction battery 2 and the start unit 4. In addition, the hardware switch 5 is connected to the base of the transistor Q1 through the diode D1 and the resistor R1, the positive electrode of the traction battery 2 is connected to the emitter of the transistor Q1 through the conversion unit 6 arranged in the battery management system 1, and the emitter of the transistor Q1 is further connected to the base of the transistor Q1 through the resistor R2. Technical personnel can adjust the transistor Q1 by setting resistance values of the resistors R1 and R2, to make the transistor work normally.

The collector of the transistor Q1 is connected to a control terminal of a MOSFET switch tube in the MOSFET array through the driving unit 12, for controlling each MOSFET switch tube to be turned on or off, thereby controlling the entire switch unit 3 to be turned on or off. The driving unit 12 specifically includes a power supply module, a micro-controller unit (MCU) and a MOSFET driving module. Specifically, the collector of the transistor Q1 sequentially controls, through the power supply module, the MCU, and the MOSFET driving module, MOSFET switch tubes to be turned on or off.

Figure 10:
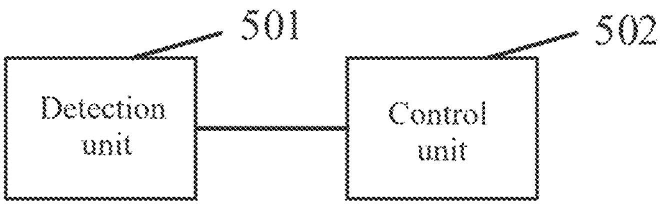
FIG. 10 is a schematic structure diagram of an over-discharge protection system of a vehicle according to an embodiment of the present application.

An embodiment of the present application provides an over-discharge protection system of a vehicle. For a schematic block diagram of the over-discharge protection system of the vehicle, reference may be made to FIG. 10. The over-discharge protection system of the vehicle includes a detection unit 501 and a control unit 502. The detection unit 501 is connected to the control unit 502. In addition, the vehicle includes a traction battery, a switch unit, a start unit, and a battery management system, where the switch unit is connected between the traction battery and the start unit, and when the switch unit is in an on state, the traction battery powers the start unit; the start unit is capable of starting the vehicle when receiving an enabling signal in a state of being powered; and the battery management system is connected to a control terminal of the switch unit for controlling the switch unit to be turned on or off.

The detection unit 501 may detect a current state of charge of the traction battery, and when the current state of charge is less than a first preset state of charge and greater than or equal to a second preset state of charge, and the switch unit is in the on state, the control unit 502 may turn off the switch unit; and when the current state of charge is less than the first preset state of charge and greater than or equal to the second preset state of charge, and the switch unit is in an off state, if a hardware trigger signal is received, turn on the switch unit, where the second preset state of charge is less than the first preset state of charge.

It is not difficult to find that this embodiment is a system embodiment corresponding to the embodiment corresponding to FIG. 3, and this embodiment can be implemented in cooperation with the embodiment corresponding to FIG. 3. The relevant technical details mentioned in the embodiment corresponding to FIG. 3 are still valid in this embodiment, and will not be repeated herein to reduce repetition. Correspondingly, the relevant technical details mentioned in this embodiment may also be applied in the embodiment corresponding to FIG. 3.

An embodiment of the present application provides a vehicle, including the foregoing over-discharge protection system of the vehicle.

Figure 11:
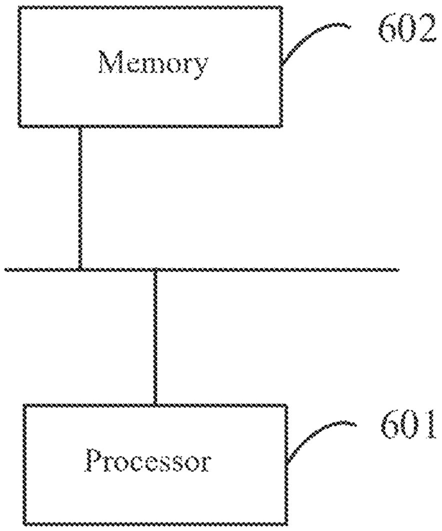
FIG. 11 is a schematic structure diagram of a battery management system according to an embodiment of the present application.

An embodiment of the present application provides a battery management system. Referring to a schematic structure diagram of a battery management system in FIG. 11, the battery management system includes: at least one processor 601; and a memory 602 communicatively connected to the at least one processor 601, where the memory 602 stores instructions executable by the at least one processor 601, and when executed by the at least one processor 601, the instructions cause the at least one processor 601 to perform any one of the foregoing over-discharge protection methods of the vehicle.

The memory 602 and the processor 601 are connected through a bus, the bus may include any number of interconnected buses and bridges, and the bus interconnects various circuits of one or more processors 601 and the memory 602. The bus may further link various other circuits such as a peripheral device, a voltage regulator, and a power management circuit together. These are all well-known in the art, and therefore are not further described in the present specification. The bus interface provides an interface between the bus and a transceiver. The transceiver may be one element or a plurality of elements, for example, a plurality of receivers and a plurality of transmitters, to provide a unit configured to communicate with various other apparatuses on a transmission medium. Data processed by the processor 601 is transmitted on a wireless medium by using an antenna. Further, the antenna further receives data and transmits the data to the processor 601.

The processor 601 is responsible for managing the bus and general processing, and may further provide various functions, including timing, peripheral interfacing, voltage regulation, power management, and another control function. The memory 602 may be configured to store data used when the processor 601 performs an operation.

An embodiment of the present application provides a computer-readable storage medium having stored thereon a computer program that, when executed by a processor, implements the over-discharge protection method of the vehicle.

In other words, those skilled in the art can understand that all or some of the steps in the methods of the above embodiments may be completed by a program instructing relevant hardware, the program is stored in a storage medium, and includes several instructions used to cause a device (which may be a single-chip microcomputer, a chip, etc.) or a processor to perform all or some of the steps of the method in various embodiments of the present application. The storage medium includes: various mediums that can store program code, such as a USB flash drive, a mobile hard disk, a read-only memory (ROM), a random access memory (RAM), a magnetic disk, or an optical disk.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. An over-discharge protection method of a vehicle, wherein the vehicle comprises a traction battery, a switcher, a starter, and a battery management system, wherein the switcher is connected between the traction battery and the starter, and when the switcher is in an on state, the traction battery powers the starter; the starter is capable of starting the vehicle when receiving an enabling signal in a state of being powered; the battery management system is connected to a control terminal of the switcher for controlling the switcher to be turned on or off, and the battery management system is further connected to the traction battery; and the method is applied to the battery management system, and the method comprises:

detecting a current state of charge of the traction battery;

when the current state of charge is less than a first preset state of charge and greater than or equal to a second preset state of charge, and the switcher is in the on state, turning off the switcher; and when the current state of charge is less than the first preset state of charge and greater than or equal to the second preset state of charge, and the switcher is in an off state, if a hardware trigger signal is received, turning on the switcher, wherein the second preset state of charge is less than the first preset state of charge, and wherein a difference between the first preset state of charge and the second preset state of charge is greater than a sum of a self-discharge power loss and an on power loss, wherein the self-discharge power loss is an amount of power lost by the traction battery after a second preset time when the switcher is in the off state, and the on power loss is an amount of power lost by the traction battery after a first preset time when the switcher is in the on state.

2. The over-discharge protection method of the vehicle according to claim 1, wherein if the hardware trigger signal is received, after the switcher is turned on, the method further comprises:

if the hardware trigger signal is not received within a first preset time after the switcher is turned on, turning off the switcher.

3. The over-discharge protection method of the vehicle according to claim 1, wherein the turning off the switcher comprises:

if it is detected that the vehicle is in a parking brake state, turning off the switcher.

4. The over-discharge protection method of the vehicle according to claim 1, wherein after the switcher is turned off, the method further comprises:

when a time during which the switcher is in the off state is greater than or equal to a third preset time, if the hardware trigger signal is received, prohibiting the switcher from being turned on.

5. The over-discharge protection method of the vehicle according to claim 1, wherein the battery management system comprises a wake-up structure and a driving structure; and a first end of the wake-up structure is connected to a first end of a hardware switch of the vehicle, a second end of the hardware switch is grounded, a second end of the wake-up structure is connected to the traction battery, and a third end of the wake-up structure is connected to the switcher through the driving structure, wherein the hardware switch is controlled by a user to be in the off state or the on state, the first end of the wake-up structure receives the hardware trigger signal when the hardware switch is in the on state, after the first end of the wake-up structure receives the hardware trigger signal, the second end of the wake-up structure and the third end of the wake-up structure are connected, such that the traction battery powers the driving structure, and when the driving structure is in the state of being powered, the current state of charge is less than the first preset state of charge and greater than or equal to the second preset state of charge, the switcher is in the off state, and the hardware trigger signal is received, the switcher is capable of being turned on.

6. The over-discharge protection method of the vehicle according to claim 5, wherein the wake-up structure is a PNP transistor, a base of the transistor serves as the first end of the wake-up structure, an emitter or a collector of the transistor serves as the second end of the wake-up structure, and the collector or the emitter of the transistor serves as the third end of the wake-up structure.

7. The over-discharge protection method of the vehicle according to claim 5, wherein the vehicle further comprises a converter;

the traction battery is connected to the second end of the wake-up structure through the converter; and the converter is configured to convert a voltage output by the traction battery into a voltage within a range of voltages that the wake-up structure is capable of receiving.

8. The over-discharge protection method of the vehicle according to claim 5, wherein the battery management system further comprises a diode; and the first end of the wake-up structure is connected to the first end of the hardware switch through the diode, the first end of the wake-up structure is connected to an anode of the diode, and a cathode of the diode is connected to the first end of the hardware switch.

9. A battery management system, comprising:

at least one processor; and a memory communicatively coupled to the at least one processor, wherein the memory stores instructions executable by the at least one processor, and when executed by the at least one processor, the instructions cause the at least one processor to perform the over-discharge protection method of the vehicle according to claim 1.

10. A non-transitory computer-readable storage medium having stored thereon a computer program that, when executed by a processor, implements the over-discharge protection method of the vehicle according to claim 1.

11. An over-discharge protection system of a vehicle, wherein the vehicle comprises a traction battery, a switcher, a starter, and a battery management system, wherein the switcher is connected between the traction battery and the starter, and when the switcher is in an on state, the traction battery powers the starter; the starter is capable of starting the vehicle when receiving an enabling signal in a state of being powered; the battery management system is connected to a control terminal of the switcher for controlling the switcher to be turned on or off, and the battery management system is further connected to the traction battery; and the system comprises:

a detector to detect a current state of charge of the traction battery; and a controller configured to: when the current state of charge is less than a first preset state of charge and greater than or equal to a second preset state of charge, and the switcher is in the on state, turn off the switcher; and when the current state of charge is less than the first preset state of charge and greater than or equal to the second preset state of charge, and the switcher is in an off state, if a hardware trigger signal is received, turn on the switcher, wherein the second preset state of charge is less than the first preset state of charge, wherein a difference between the first preset state of charge and the second preset state of charge is greater than a sum of a self-discharge power loss and an on power loss, wherein the self-discharge power loss is an amount of power lost by the traction battery after a second preset time when the switcher is in the off state, and the on power loss is an amount of power lost by the traction battery after a first preset time when the switcher is in the on state.

12. A vehicle, comprising the over-discharge protection system of the vehicle according to claim 11.

* * * * *